(12) United States Patent
Wu

(10) Patent No.: US 12,296,882 B1
(45) Date of Patent: May 13, 2025

(54) SIDE BOOM NON-SLIDING TRAILER

(71) Applicant: Wuyi County Haiqiu Technology Co., Ltd., Jinhua (CN)

(72) Inventor: Qingyuan Wu, Bozhou (CN)

(73) Assignee: Wuyi County Haiqiu Technology Co., Ltd., Jinhua (CN)

( * ) Notice: Subject to any disclaimer, the term of this patent is extended or adjusted under 35 U.S.C. 154(b) by 0 days.

(21) Appl. No.: 18/901,521

(22) Filed: Sep. 30, 2024

(30) Foreign Application Priority Data

Jun. 24, 2024 (CN) .......................... 202421446741.8

(51) Int. Cl.
*B62B 3/02* (2006.01)

(52) U.S. Cl.
CPC ............ *B62B 3/02* (2013.01); *B62B 2205/06* (2013.01)

(58) Field of Classification Search
CPC ........... B62B 3/02; B62B 3/025; B62B 3/007; B62B 2205/06
See application file for complete search history.

(56) References Cited

U.S. PATENT DOCUMENTS

| | | | |
|---|---|---|---|
| 2023/0406384 A1* | 12/2023 | Sun ........................... | B62B 3/02 |
| 2024/0124040 A1* | 4/2024 | Conn ....................... | B62B 5/067 |
| 2024/0132129 A1* | 4/2024 | Sun .......................... | B62B 3/007 |
| 2024/0227893 A9* | 7/2024 | Sun .......................... | B62B 5/064 |
| 2024/0270298 A1* | 8/2024 | Song ........................ | B62B 5/067 |
| 2024/0294197 A1* | 9/2024 | Qiao ........................ | B62B 3/007 |
| 2024/0300559 A1* | 9/2024 | Zhou ........................ | B62B 3/025 |

* cited by examiner

*Primary Examiner* — Katy M Ebner
(74) *Attorney, Agent, or Firm* — JEEN IP LAW, LLC

(57) ABSTRACT

The disclosure relates to the field of outdoor use trailer, in particular discloses a side suspender non-sliding trailer, comprising a first vertical pole and a second vertical pole, a left and right connecting rod group is arranged between the first vertical pole and the second vertical pole, a bottom connecting rod group is arranged at the bottom of the first vertical pole and the second vertical pole, a first fixing sleeve and a second fixing sleeve are fixed at the top and bottom of the first vertical pole and the second vertical pole, and a sliding sleeve is arranged outside the first vertical pole and the bottom connecting rod group is arranged with a side suspender. The disclosure through the matching of the left and right link group and the sliding sleeve, so that the bottom of the trailer is lowered when folding, it can also ensure its structural stability.

5 Claims, 5 Drawing Sheets

SIDE BOOM NON-SLIDING TRAILER

TECHNICAL FIELD

The disclosure relates to the field of outdoor trailers, in particular to a side suspender non-sliding trailer.

BACKGROUND TECHNOLOGY

Outdoor activity trailers, also known as camp trailers, camping trailers, camping trailers, etc., are usually used to transport outdoor equipment from indoors or vehicles to the activity destination during outdoor activities.

In order to facilitate storage, most trailers are equipped with foldable structures. Usually, a folding structure with multiple cross bars between two side support frames is selected. In order to increase the storage space, a double cross structure is selected at the bottom. Based on this, in order to ensure the stability of the bottom support, a side boom that can hang the base will be set in the center of the cross bar.

However, when the above-mentioned trailer is stored, in order not to achieve the effect that the top does not rise after folding, the side boom needs to slide downward with the folding of the cross bar. Therefore, the side boom and the double cross bottom do not adopt a fixed structure, which undoubtedly reduces its structural stability and has limited load-bearing capacity for the bottom double cross trailer with large load-bearing weight.

The technical problem to be solved in the present application is: how to fix the side boom and the bottom double cross trailer while still realizing the effect of not raising after folding.

INVENTION CONTENT

In order to overcome the shortcomings of the prior art, the purpose of the disclosure is to provide a side boom non-sliding trailer which does not rise after folding and has strong bottom carrying capacity.

The technical scheme adopted by the disclosure is: a side suspender non-sliding trailer, comprising two first vertical poles and second vertical poles, left and right connecting rod groups are arranged between the first vertical poles and the second vertical poles, bottom connecting rod groups are arranged at the bottom of the first vertical poles and the second vertical poles, first fixing sleeve and second fixing sleeve are fixed at the top and bottom of the first vertical poles and the second vertical poles, and sliding sleeve is arranged outside the first vertical poles and the second vertical poles;

The top of the left and right connecting rod group is rotationally matched with the first fixing sleeve, the bottom of the left and right connecting rod group is rotationally matched with the sliding sleeve, the bottom connecting rod group is rotationally matched with the second fixing sleeve, a side suspender is arranged between the left and right connecting rod group and the bottom connecting rod group, the top of the side suspender is movably riveted with the left and right connecting rod group, and the bottom of the side suspender is fixedly installed with the bottom connecting rod group.

The sliding sleeve slides up and down along the first vertical pole and the second vertical pole, and when the left and right connecting rod groups are folded, the bottom of the sliding sleeve moves downward with the descent of the sliding sleeve, so that the height of the top of the sliding sleeve is kept unchanged, and the side suspenders at the bottom of the left and right connecting rod groups provide upward pulling force for the bottom connecting rod group, thus sharing the pressure when the bottom connecting rod group is loaded, so that the bottom connecting rod group can carry more goods.

In some embodiments, the left and right connecting rod group includes a first left and right link and an eighth left and right link rotationally connected to the first fixing sleeve, and a second left and right link and a seventh left and right link rotationally connected to the sliding sleeve.

In some embodiments, the left and right connecting rod group further includes a fourth left-right link and a sixth left-right link connected to both sides of the side boom, and a third left-right link and a fifth left-right link intersecting outside the side boom.

In some embodiments, the top end of the side boom is located at the connection end point of the fourth left and right link and the sixth left and right link, and the middle part of the side boom is located at the connection center point of the third left and right link and the fifth left and right link.

In some embodiments, the bottom connecting rod group includes a first bottom connector and a second bottom connector respectively located at the bottom of the two first vertical poles, a third bottom link and a fourth bottom link respectively rotatably connected with the first bottom connector.

In some embodiments, the bottom connecting rod group further includes a seventh bottom connecting rod and an eighth bottom connecting rod respectively located at the bottom of the two second vertical poles, a second bottom connecting member rotatably connected with the seventh bottom connecting rod and the eighth bottom connecting rod is provided at an intersection point of the seventh bottom connecting rod and a fifth bottom connecting rod and a sixth bottom connecting rod respectively connected with the second bottom connecting rod.

In some embodiments, the connection of the third bottom link and the seventh bottom link and the connection of the fourth bottom link and the eighth bottom link are respectively provided with a first side connection member and a second side connection member, and the first side connection member and the second side connection member are respectively fixedly installed with the two side booms.

In some embodiments, the front and rear connecting rod groups are respectively provided between the two first vertical poles and the two second vertical poles, the top portions of the front and rear connecting rod groups are rotationally matched with the first fixing sleeve, and the bottom portions of the front and rear connecting rod groups are rotationally matched with the sliding sleeve.

In some embodiments, the front and rear connecting rod group includes a first front and rear link and a third front and rear link rotationally connected to the first fixing sleeve, and the front and rear connecting rod group further includes a second front and rear link rotationally connected to the sliding sleeve and a fourth front and rear link rotationally connected to the sliding sleeve.

The beneficial effects of the disclosure are: through the matching of the left and right connecting rod group and the sliding sleeve, the bottom of the trailer is lowered when folding, so that it has the technical effect that the top will not rise, at the same time, the structure of the bottom connecting rod group is the matching of two groups of cross cross rods, which increases its bearing area, so that it can carry more goods, and the setting of the side suspender, so that the left and right connecting rod group helps it to bear the pressure of part of the bottom connecting rod group, while carrying more goods can also ensure its structural stability.

ILLUSTRATIONS

In the picture:
1. A first vertical pole; 2. Second vertical pole; 3, a first fixing sleeve; 4. Sliding sleeve; 5. Second fixing sleeve;
6. Left and right connecting rod groups; 61 first left and right link; 62 second left and right link; 63 third left and right link; 64 fourth left and right link; 65 fifth left and right connecting rod; 66 sixth left and right connecting rod; 67 seventh left and right connecting rods; 68 eighth left and right connecting rods;
7. Front and rear connecting rod groups; 71 first front-rear link; 72 second front-rear link; 73 third front and rear link; 74 fourth front and rear link;
8. Bottom connecting rod group; 81 first bottom link; 82 second bottom link; 83 third bottom link; 84 fourth bottom link; 85 fifth bottom link; 86 sixth bottom link; 87 seventh bottom link; 88 eighth bottom connecting rod; 89 first bottom connector; 90 second bottom connector;
91 first side link; 92 second side link; 9. Side boom.

DETAILED IMPLEMENTATION

The technical scheme in the embodiment of the disclosure will be clearly and completely described in combination with the drawings in the embodiment of the disclosure below, obviously, the described embodiment is only a part of the embodiment of the disclosure, not all of the embodiments. Based on the embodiments in the disclosure, all other embodiments obtained by ordinary skilled personnel in the art without making creative labor belong to the scope of protection of the disclosure.

Figure 1:
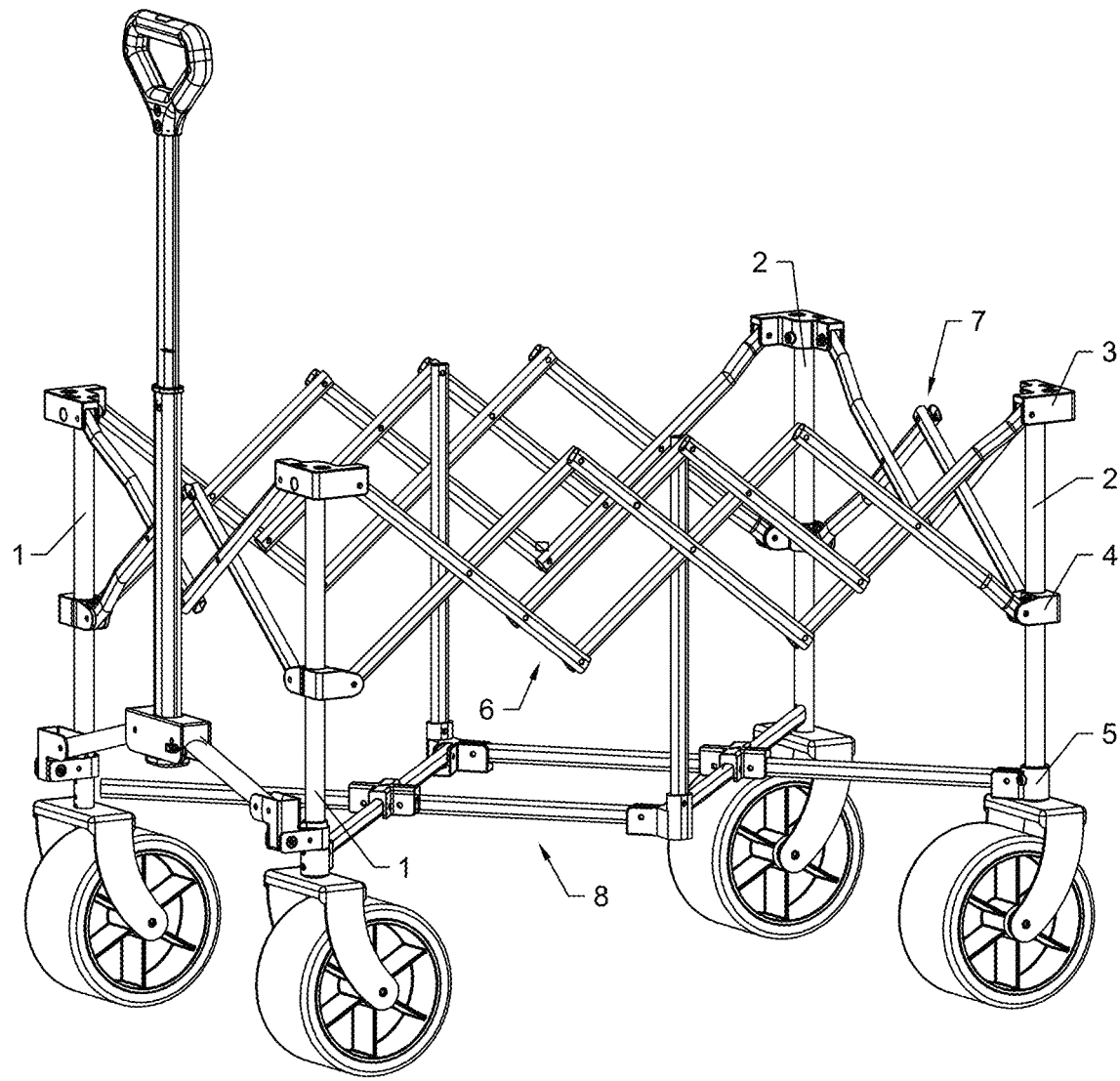
FIG. 1 is a schematic diagram of a three-dimensional structure of the disclosure.

Please refer to FIG. 1, the disclosure provides a technical solution: a side boom non-sliding trailer, comprising two first vertical poles 1 and two second vertical poles 2, four vertical poles form a rectangular shape, the two ends of the first vertical pole 1 and the second vertical pole 2 are respectively fixedly connected with the first fixed sleeve 3 and the second fixed sleeve 5, the outside of each vertical pole is provided with a sliding sleeve 4 that can slide along its surface, the first vertical pole 1 and the second vertical pole 2 is provided with a left and right connecting rod group 6, the two first vertical pole 1 and the second vertical pole 2 is provided with a front and rear connecting rod group 7, the two first vertical pole 1 and the second vertical pole 2 is provided with a front and rear connecting rod group 7, and the four vertical pole is provided with a bottom connecting rod group 8.

Figure 2:
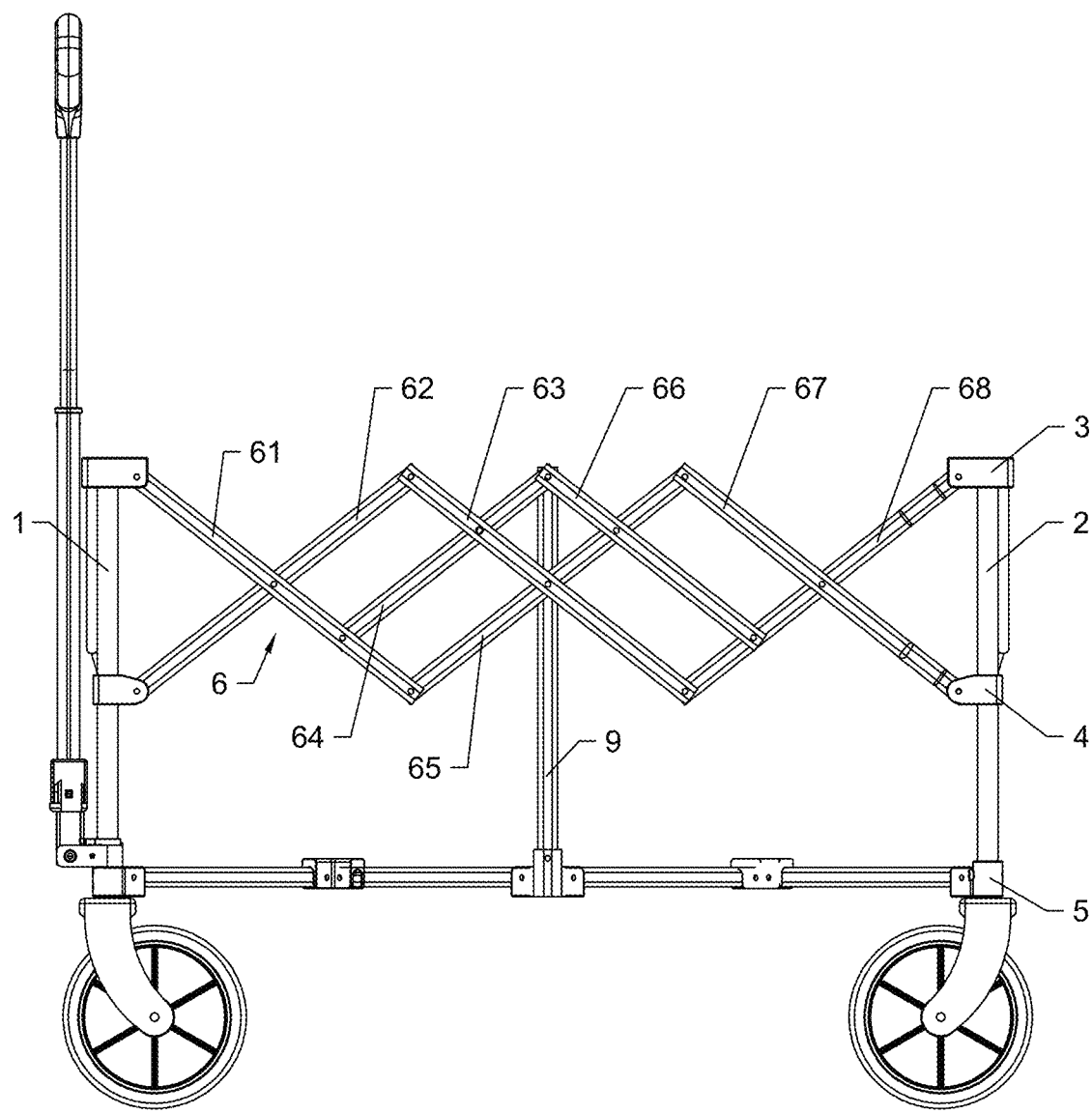
FIG. 2 is a schematic view of the front structure of the disclosure.

Referring to FIGS. 1 and 2, the left and right connecting rod group 6 includes a first left and right link 61, a second left and right link 62, a third left and right link 63, a fourth left and right link 64, a fifth left and right link 65, a sixth left and right link 66, a seventh left and right link 67 and an eighth left and right link 68, The fourth left and right link 64 is connected to the middle two-thirds of the first left and right link 61, the sixth left and right link 66 is connected to the middle two-thirds of the eighth left and right link 68, the fourth left and right link 64 is also connected to the middle quarter of the third left and right link 63, and the sixth left and right link 66 is also connected to the middle quarter of the fifth left and right link 65.

Figure 3:
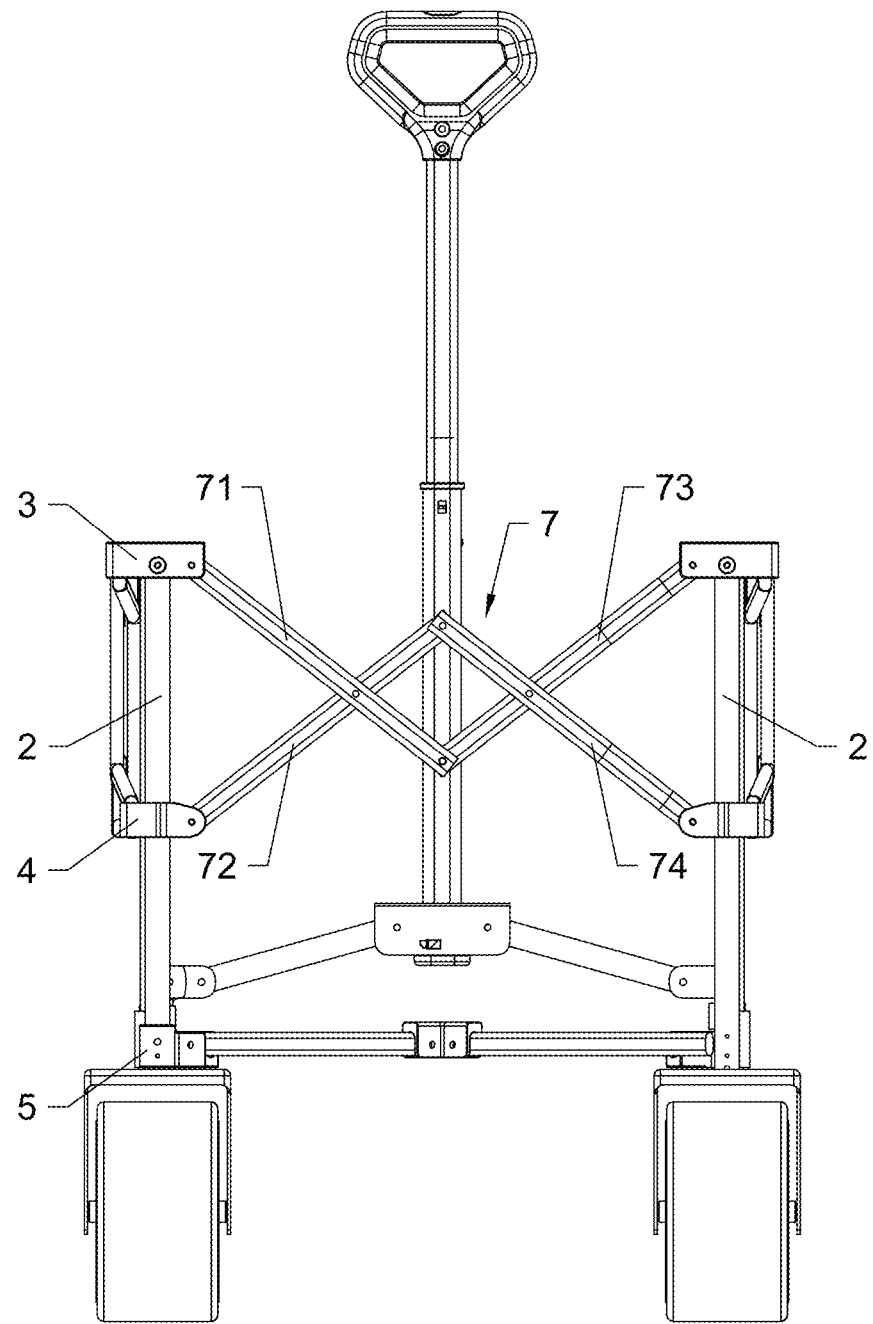
FIG. 3 is a schematic view of the right side structure of the disclosure.

Referring to FIGS. 1 and 3, the front and rear connecting rod group 7 includes a first front-rear link 71, a second front-rear link 72, a third front-rear link 73 and a fourth front-rear link 74, wherein the first front-rear link 71 and the third front-rear link 73 and the fourth front-rear link 74 are cross-connected, and the third front-rear link 73 and the fourth front-rear link 74 are cross-connected.

Figure 4:
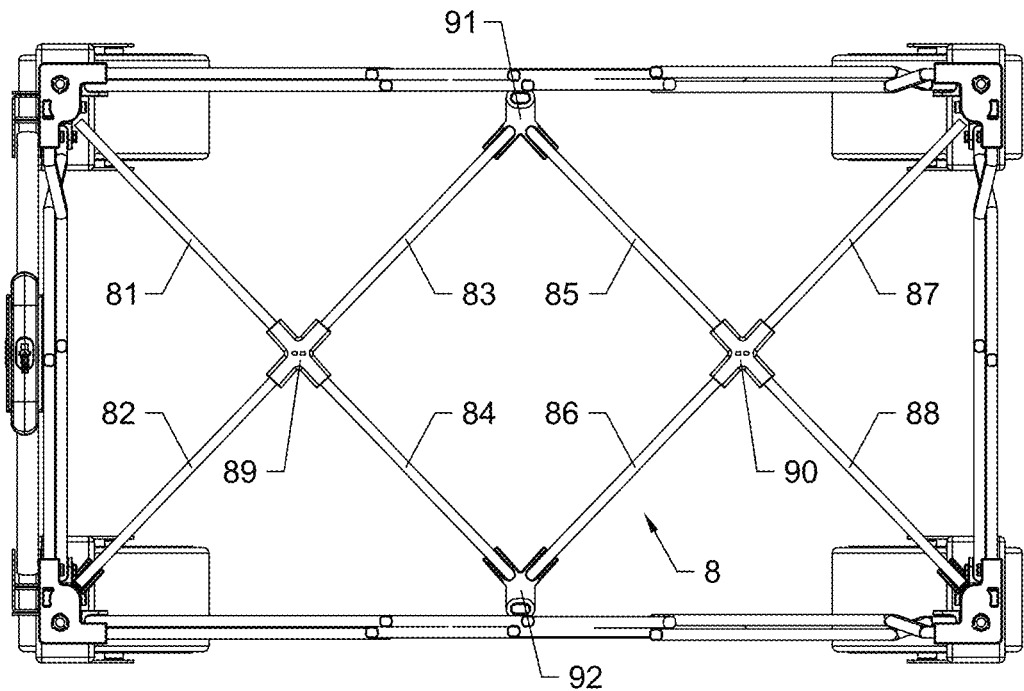
FIG. 4 is a schematic view of the top structure of the disclosure.

Referring to FIGS. 1 and 4, the bottom connecting rod group 8 includes a first bottom link 81, a second bottom link 82, a third bottom link 83, a fourth bottom link 84, a fifth bottom link 85, a sixth bottom link 86, a seventh bottom link 87 and an eighth bottom link 88, wherein the first bottom link 81, the second bottom link 82, the third bottom link 83 and the fifth bottom link 85 are connected in the first side link 91, The fourth bottom link 84 and the sixth bottom link 86 are connected within the second side link 92.

Figure 5:
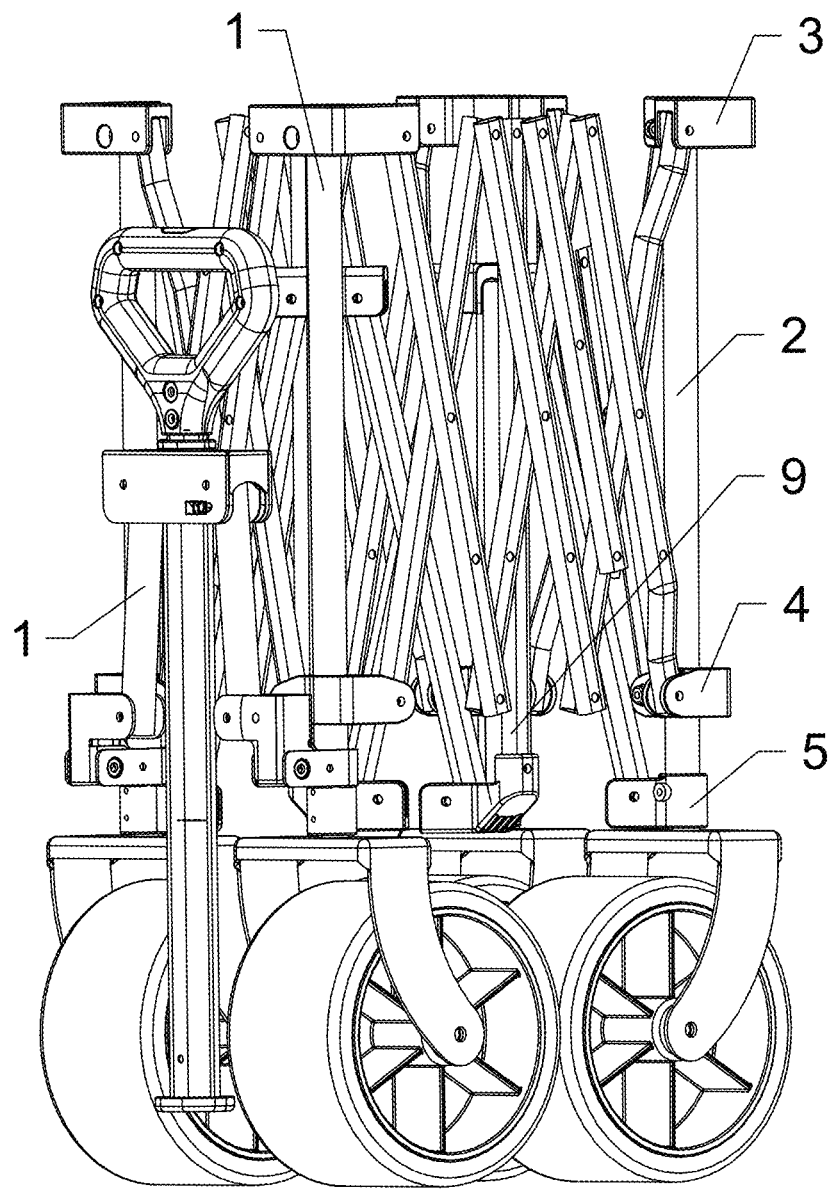
FIG. 5 is a schematic diagram of the folded structure of the disclosure.

Please refer to FIGS. 1 and 5, for the disclosure folding storage principle, when folding, first to the center of squeeze four vertical poles, make left and right connecting rod group 6 and front and rear connecting rod group 7 to cross close, when close, left and right connecting rod group 6 and front and rear connecting rod group 7 lowest point squeeze sliding sleeve 4 to move downward, so as to ensure that its top does not appear rising phenomenon, at this time, lift up the first bottom connector 89 and second bottom connector 90, make the first bottom link 81, second bottom link 82, third bottom link 83 and fourth bottom link 84 and fifth bottom link 85, sixth bottom link 86, seventh bottom link 87 and eighth bottom link 88 respectively about the first bottom connector 89 and second bottom connector 90 upward, form a tapered shape, gradually complete the whole trailer storage.

Finally, it should be noted that the above is only a preferred example of the present disclosure, and is not used to limit the present disclosure. Although the present disclosure has been described in detail with reference to the above-mentioned embodiments, for those skilled in the art, it can still modify the technical solutions described in the above-mentioned embodiments, or make equivalent replacements for some technical features thereof. Any modification, equivalent substitution, improvement, etc. made within the spirit and principles of the present disclosure should be included in the scope of protection of the present disclosure.

What is claimed is:
1. A trailer having a non-sliding side boom, comprising:
two first vertical poles and two second vertical poles, wherein left and right connecting rod groups are arranged between the first vertical poles and the second vertical poles, and a bottom connecting rod group is arranged at the bottom of the first vertical poles and the second vertical poles;
a first fixing sleeve and a second fixing sleeve fixed at the top and bottom, respectively, of each first vertical pole and each second vertical pole;
a sliding sleeve slidably matched with each first vertical pole and each second vertical pole;
wherein the tops of the left and right connecting rod groups are rotatably matched with the first fixing sleeves and the bottoms of the left and right connecting rod groups are rotatably matched with the sliding sleeves, wherein the bottom connecting rod group is rotatably matched with each second fixing sleeve, wherein a side boom is arranged between each of the left and right connecting rod groups and the bottom connecting rod group, the top of each side boom is movably riveted to a respective one of the left and right connecting rod groups, and the bottom part of each side boom is fixedly installed with the bottom connecting rod group;

wherein each of the left and right connecting rod groups comprises a first left-and-right link that is connected to one of the first fixing sleeves, an eighth left-and-right link that is connected to a different one of the first fixing sleeves, a second left-and-right link that is connected to one of the sliding sleeves, and a seventh left-and-right link that is connected to a different one of the sliding sleeves;

wherein the left and right connecting rod groups further comprise a fourth left-and-right link and a sixth left-and-right link that are connected to two sides of the side boom, and a third left-and-right link and a fifth left-and-right link that are intersected outside the side boom;

a top end of the side boom is located at a connecting end point of the fourth left-and-right link and the sixth left-and-right link, and a middle part of the side boom is located at a connecting center point of the third left-and-right link and the fifth left-and-right link.

2. The trailer having a non-sliding side boom according to claim 1, wherein the bottom connecting rod group comprises a first bottom connector and a second bottom connector, one side of the first bottom connector is provided with a third bottom link and a fourth bottom link;

another side of the first bottom connector is further provided with a first bottom link and a second bottom link;

one side of the second bottom connector is provided with a seventh bottom link and an eighth bottom link;

another side of the second bottom connector is further provided with a fifth bottom link and a sixth bottom link.

3. The trailer having a non-sliding side boom according to claim 2, wherein a connection of the third and seventh bottom links and a connection of the fourth and eighth bottom links are respectively provided with a first side link and a second side link, the first side link and the second side link are fixedly mounted with the side booms, respectively.

4. The trailer having a non-sliding side boom according to claim 1, wherein front and rear connecting rod groups are respectively arranged between the two first vertical poles and the two second vertical poles;

tops of the front and rear connecting rod groups rotationally cooperate with the first fixing sleeve, and bottoms of the front and rear connecting rod groups rotationally cooperate with the sliding sleeve.

5. The trailer having a non-sliding side boom according to claim 4, wherein the front and rear connecting rod groups comprise a first front-and-rear link and a third front-and-rear link rotationally connected to the first fixing sleeve, and the front and rear connecting rod groups further comprise a second front-and-rear link and a fourth front-and-rear link rotationally connected to the sliding sleeve.

\* \* \* \* \*